United States Patent
McGirt, Jr. et al.

(10) Patent No.: US 11,760,268 B1
(45) Date of Patent: Sep. 19, 2023

(54) VEHICLE SURVEILLANCE ASSEMBLY

(71) Applicants: Carl McGirt, Jr., Puyallup, WA (US);
Carl McGirt, Sr., Victorville, CA (US)

(72) Inventors: Carl McGirt, Jr., Puyallup, WA (US);
Carl McGirt, Sr., Victorville, CA (US)

( * ) Notice: Subject to any disclaimer, the term of this patent is extended or adjusted under 35 U.S.C. 154(b) by 0 days.

(21) Appl. No.: 17/743,599

(22) Filed: May 13, 2022

(51) Int. Cl.
| | | |
|---|---|---|
| *B60R 1/27* | (2022.01) |
| *B60R 1/29* | (2022.01) |
| *B60R 1/12* | (2006.01) |
| *B60R 11/04* | (2006.01) |
| *H04B 17/318* | (2015.01) |
| *H04N 7/18* | (2006.01) |
| *B60R 11/00* | (2006.01) |

(52) U.S. Cl.
CPC .................. *B60R 1/27* (2022.01); *B60R 1/12* (2013.01); *B60R 1/29* (2022.01); *B60R 11/04* (2013.01); *H04B 17/318* (2015.01); *H04N 7/185* (2013.01); *B60R 2001/1253* (2013.01); *B60R 2011/0003* (2013.01); *B60R 2011/004* (2013.01)

(58) Field of Classification Search
CPC .... B60R 1/27; B60R 1/12; B60R 1/29; B60R 11/04; B60R 2001/1253; B60R 2011/0003; B60R 2011/004; H04B 17/318; H04N 7/185
See application file for complete search history.

(56) References Cited

U.S. PATENT DOCUMENTS

| | | | |
|---|---|---|---|
| 6,333,759 B1 | 12/2001 | Mazzilli | |
| 9,578,275 B2 * | 2/2017 | Ramirez | ............... G07C 5/0891 |
| 9,747,795 B1 | 8/2017 | Espinosa | |
| 10,445,187 B2 | 10/2019 | Shrestha | |
| 2013/0245881 A1 | 9/2013 | Scarbrough | |
| 2016/0189391 A1 * | 6/2016 | Demartin | ......... G08B 13/19602 |
| | | | 382/103 |
| 2018/0072270 A1 | 3/2018 | Renaud | |

FOREIGN PATENT DOCUMENTS

CA            2496326       3/2004

* cited by examiner

*Primary Examiner* — Howard D Brown, Jr.
*Assistant Examiner* — Tyler B Edwards (57) ABSTRACT

A vehicle surveillance assembly includes an inside video camera mounted within a cabin of a vehicle to record video footage of an interior of the cabin. A plurality of outside video cameras is each mounted to an exterior of the vehicle to record video footage of the environment surrounding the vehicle. A tracking unit is wearable on the driver of the vehicle and the tracking unit broadcasts a tracking signal. A control unit is positioned within the vehicle and the control unit is in remote communication with the tracking unit, the inside video camera and each of the plurality of outside video cameras. The control unit actuates the inside video camera when the control unit determines the tracking unit is inside of the vehicle. Conversely, the control unit actuates each of the plurality of outside video cameras when the control unit determines the tracking unit is outside of the vehicle.

10 Claims, 5 Drawing Sheets

VEHICLE SURVEILLANCE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

The disclosure relates to surveillance devices and more particularly pertains to a new surveillance device for recording video footage inside of a vehicle or outside of a vehicle. The device includes an inside video camera that is mounted inside a cabin of a vehicle and a plurality of video cameras that are mounted to an exterior of the vehicle. The device includes a tracking unit worn by a driver of the vehicle and a control unit positioned in the vehicle. The control unit is in wireless communication with the tracking unit, the inside video camera and the outside video camera. The control unit turns on the inside video camera when the tracking unit demonstrates that the driver is in the vehicle.

The control unit turns on the outside video camera when the tracking unit demonstrates that the driver has exited the vehicle.

(2) Description of Related Art Including Information Disclosed Under 37 CFR 1.97 and 1.98.

The prior art relates to surveillance devices including a dash cam for a vehicle that has a 360.0 degree field of vision. The prior art discloses vehicle recording device that includes a plurality of video cameras distributed around a vehicle and a recording device for storing footage recorded by the video cameras. The prior art discloses a vehicle surveillance device that includes a video camera and an alert device for alerting a driver that a potential assailant is approaching the vehicle. The prior art discloses a video security system that includes a plurality of video cameras mounted to a vehicle and controller that activates respective video cameras based on a triggering event for recording selected areas around the vehicle.

BRIEF SUMMARY OF THE INVENTION

An embodiment of the disclosure meets the needs presented above by generally comprising an inside video camera mounted within a cabin of a vehicle to record video footage of an interior of the cabin. A plurality of outside video cameras is each mounted to an exterior of the vehicle to record video footage of the environment surrounding the vehicle. A tracking unit is wearable on the driver of the vehicle and the tracking unit broadcasts a tracking signal. A control unit is positioned within the vehicle and the control unit is in remote communication with the tracking unit, the inside video camera and each of the plurality of outside video cameras. The control unit actuates the inside video camera when the control unit determines the tracking unit is inside of the vehicle. Conversely, the control unit actuates each of the plurality of outside video cameras when the control unit determines the tracking unit is outside of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
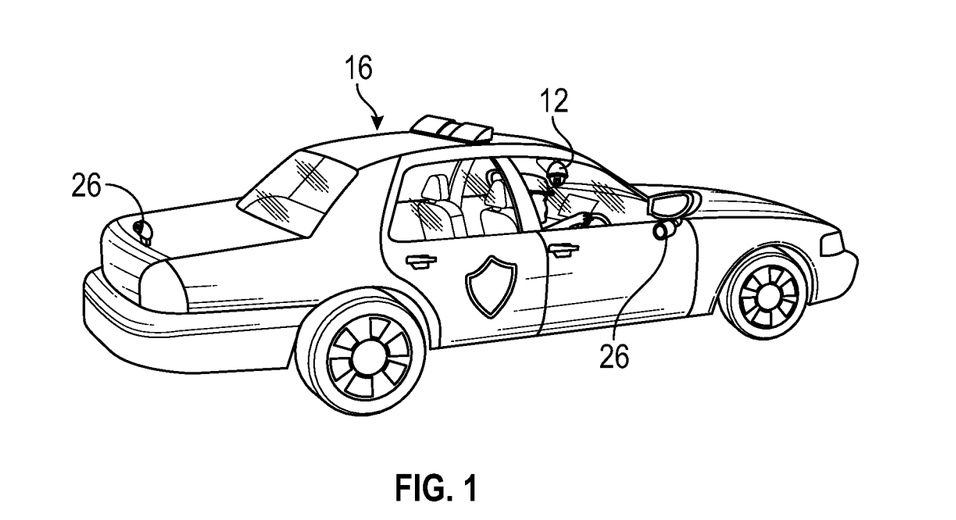
FIG. 1 is a perspective in-use view of an embodiment of the disclosure showing a driver inside of a vehicle.
Figure 2:
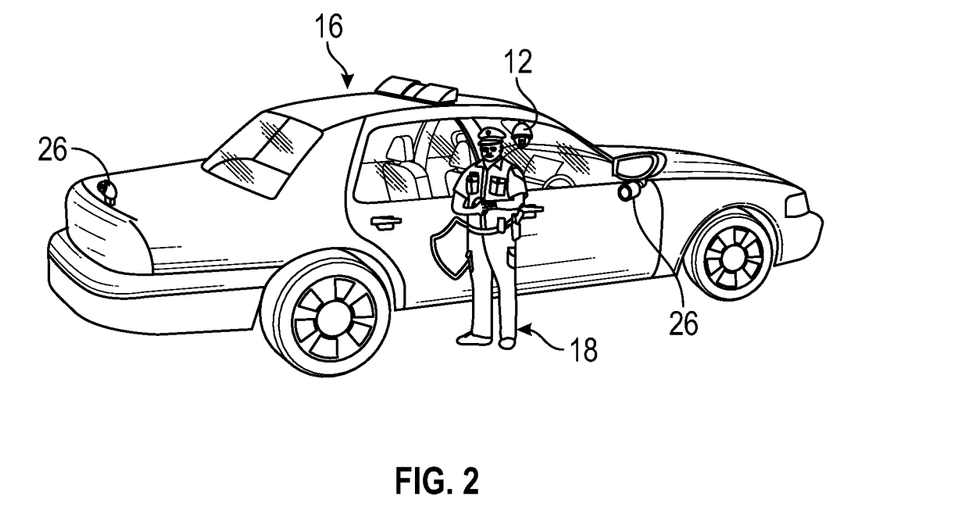
FIG. 2 is a perspective in-use view of an embodiment of the disclosure showing a driver outside of a vehicle.
Figure 3:
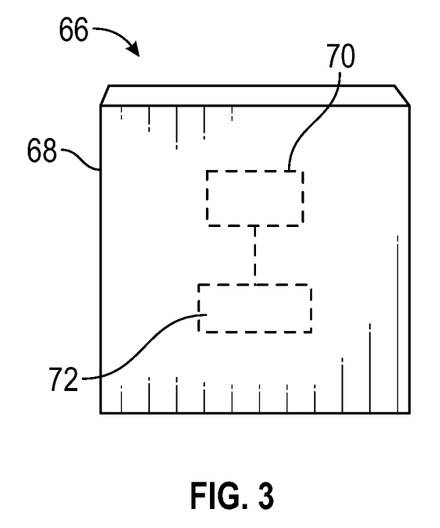
FIG. 3 is a perspective view of a control unit of an embodiment of the disclosure.
Figure 4:
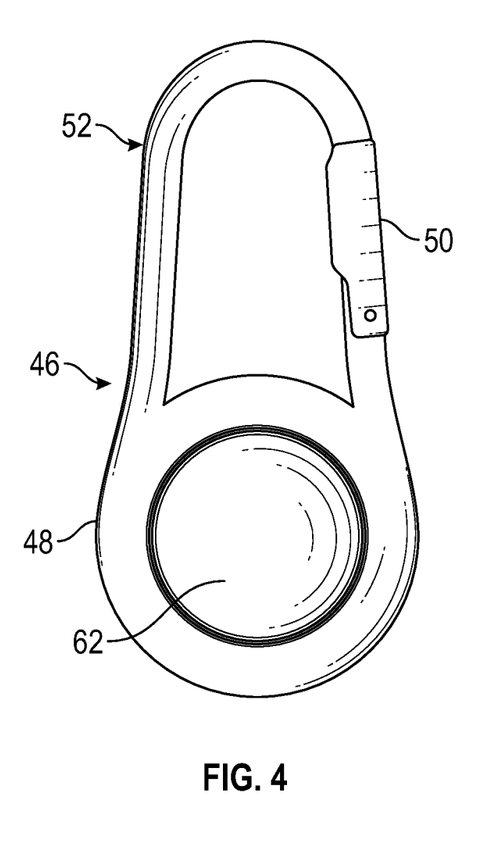
FIG. 4 is a perspective view of a tracking unit of an embodiment of the disclosure.
Figure 5:
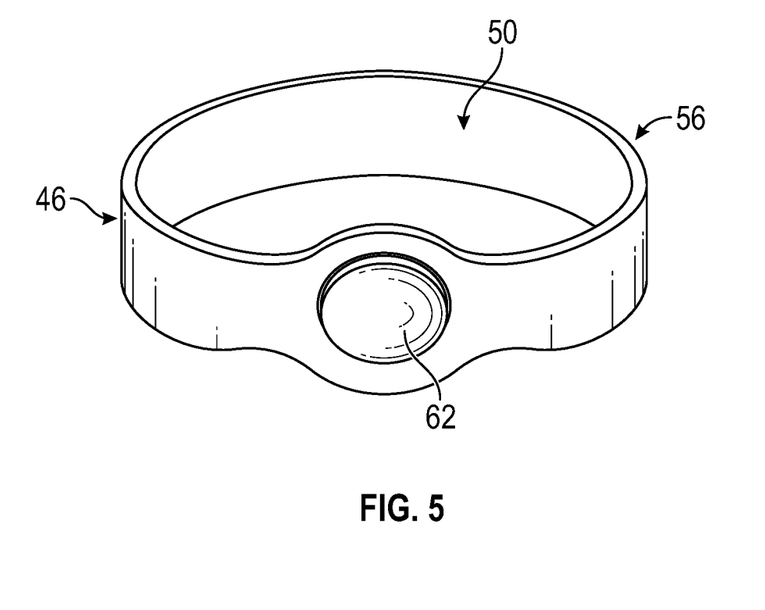
FIG. 5 is a front view of a tracking unit of an embodiment of the disclosure.
Figure 6:
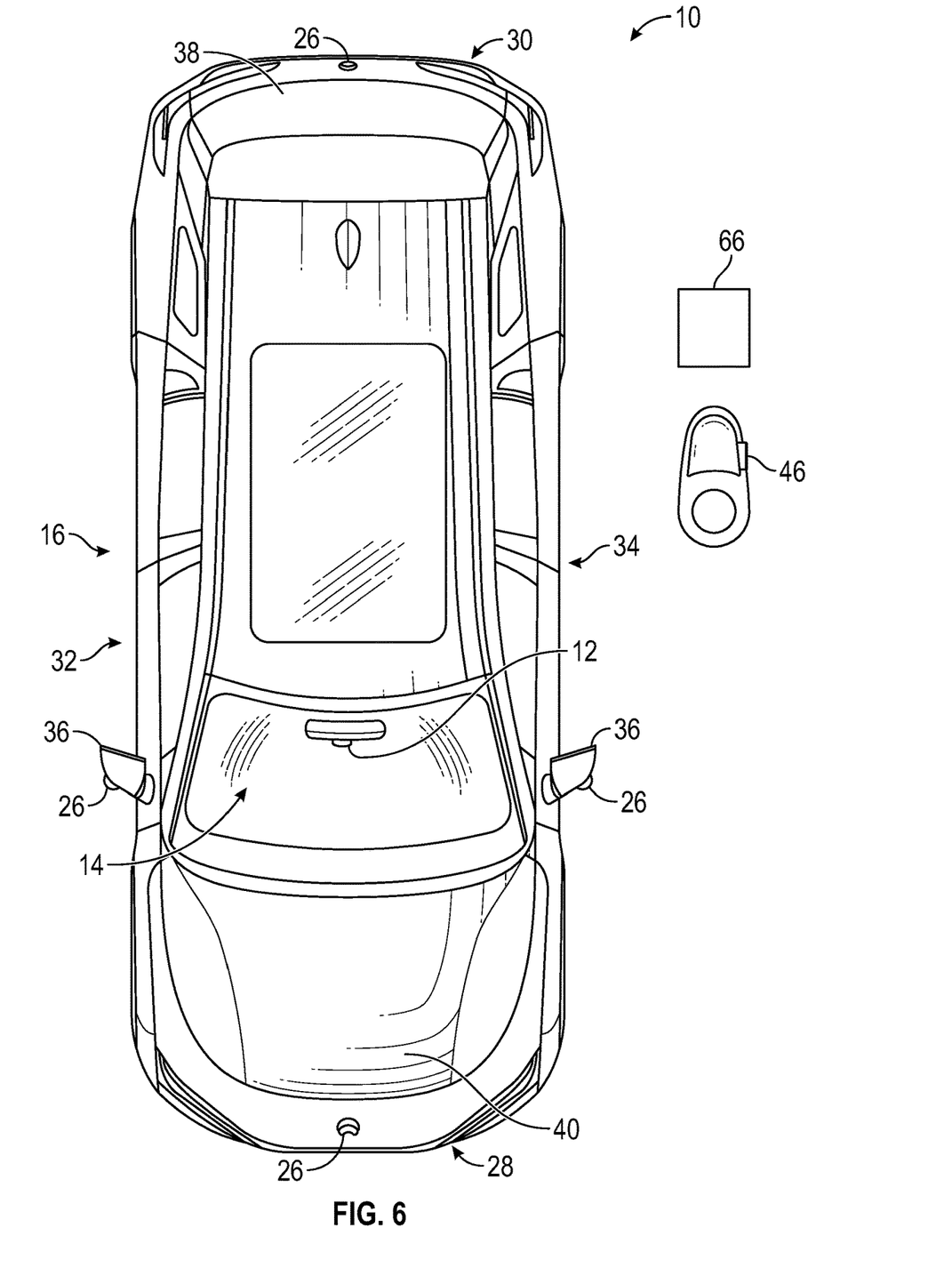
FIG. 6 is a perspective view of a vehicle surveillance assembly according to an embodiment of the disclosure.
Figure 7:
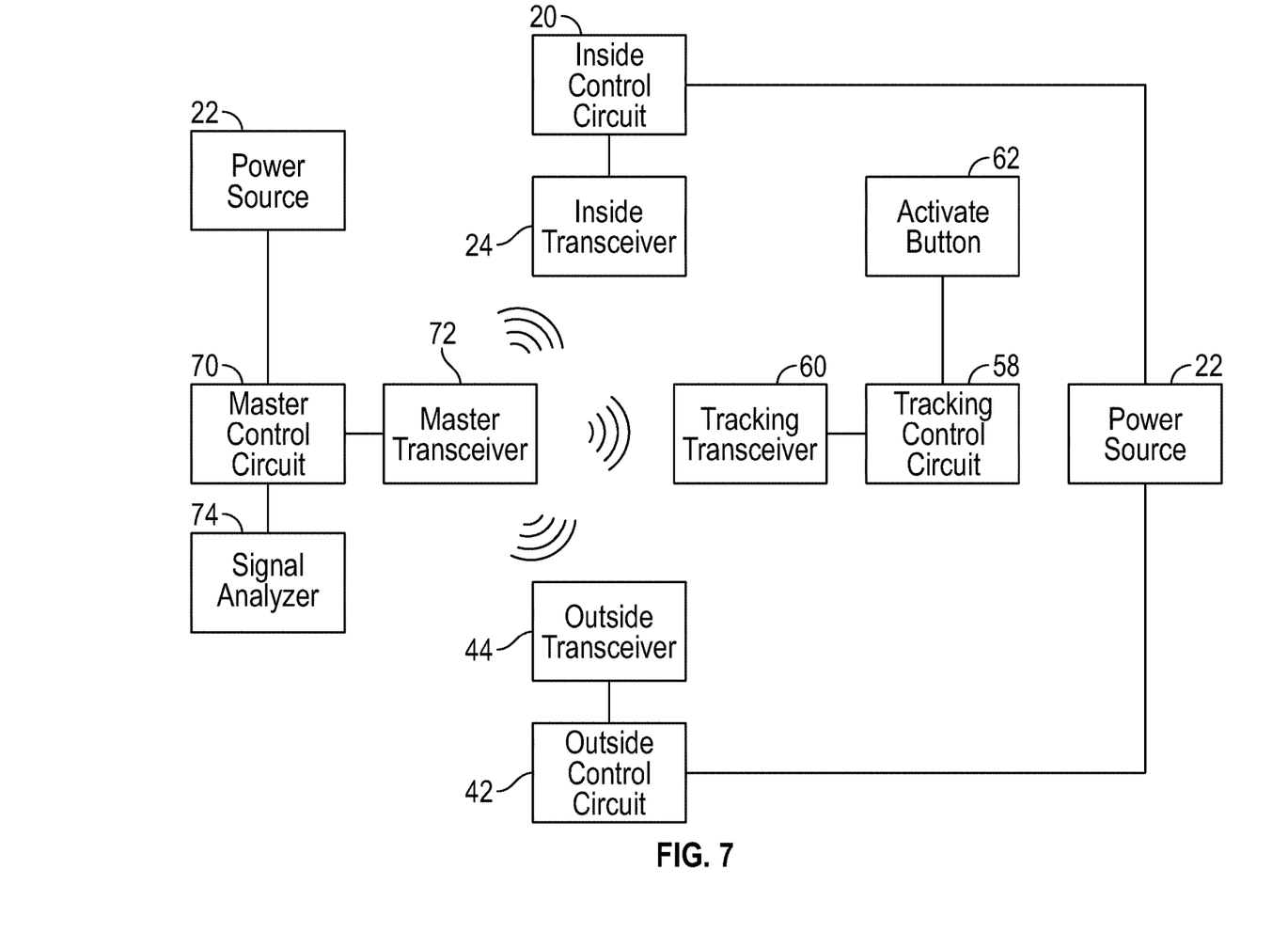
FIG. 7 is a schematic view of an embodiment of the disclosure.

With reference now to the drawings, and in particular to FIGS. 1 through 7 thereof, a new surveillance device embodying the principles and concepts of an embodiment of the disclosure and generally designated by the reference numeral 10 will be described.

As best illustrated in FIGS. 1 through 7, the vehicle surveillance assembly 10 generally comprises an inside video camera 12 that is mounted within a cabin 14 of a vehicle 16 to record video footage of an interior of the cabin 14. The inside video camera 12 is strategically positioned in the cabin 14 to facilitate the inside video camera 12 to record video footage of the driver 18 while the driver 18 is driving the vehicle 16. The vehicle 16 may comprise an emergency vehicle such as a police car or the like. Additionally, the vehicle 16 may comprise a passenger vehicle, a cargo vehicle or any other motorized vehicle that is driven on public roadways. Additionally, the inside video camera 12 may comprise a digital video camera of any conventional design.

The inside video camera 12 includes an inside control circuit 20 that is integrated into the inside video camera 12 and the inside control circuit 20 receives an actuate input.

The inside video camera 12 is turned on when the inside control circuit 20 receives the actuate input. Additionally, the inside control circuit 20 is electrically coupled to a power source 22 comprising an electrical system of the vehicle 16. The inside video camera 12 includes an inside transceiver 24 that is integrated into the inside video camera 12 and the inside transceiver 24 is electrically coupled to the inside control circuit 20. The inside transceiver 24 may comprise a radio frequency transceiver or the like and the inside transceiver 24 may employ Bluetooth communication protocols.

A plurality of outside video cameras 26 is provided and each of the outside video cameras 26 is mounted to an exterior of the vehicle 16 to record video footage of the environment surrounding the vehicle 16. The plurality of outside video cameras 26 is positioned on a respective one of a front side 28 of the vehicle 16, a back side 30 of the vehicle 16, a first lateral side 32 of the vehicle 16 and a second lateral side 34 of the vehicle 16. In this way the plurality of outside video cameras 26 can record footage of 360.0 degrees around the vehicle 16. Each of the outside video cameras 26 may comprise a digital video camera of any conventional design. Each of the outside video cameras 26 that is positioned on the first lateral side 32 and the second lateral side 34 of the vehicle 16 may be mounted to respective rear view mirrors 36 of the vehicle 16. The outside video camera 26 on the back side 30 of the vehicle 16 may be mounted to a trunk 38 of the vehicle 16 and the outside video camera 26 on the front side 28 of the vehicle 16 may be mounted to a hood 40 of the vehicle 16.

Each of the outside video cameras 26 includes an outside control circuit 42 that is integrated into the outside video camera 26 and the outside control circuit 42 receives an actuate input. Furthermore, the outside video camera 26 is turned on when the outside control circuit 42 receives the actuate input. The outside control circuit 42 is electrically coupled to the power source 22 comprising the electrical system of the vehicle 16. Each of the outside video cameras 26 includes an outside transceiver 44 that is integrated into the outside video camera and the outside transceiver 44 is electrically coupled to the outside control circuit 42. The outside transceiver 44 may comprise a radio frequency transceiver or the like and the outside transceiver 44 may employ Bluetooth communication protocols.

A tracking unit 46 is provided that is wearable on the driver 18 of the vehicle 16 and the tracking unit 46 broadcasts a tracking signal. The tracking unit 46 comprises a tracking housing 48 that has an engagement element 50 to engage the driver 18 for retaining the tracking housing 48 on the driver 18. As is most clearly shown in FIG. 4, the tracking housing 48 may comprise a keychain clip 52 and the engagement element 50 may comprise a clasp 54 that is movably integrated into the keychain clip. As is most clearly shown in FIG. 5, the tracking housing 48 may comprise a bracelet 56 that can be worn on the driver 18's wrist and the engagement element 50 may be defined by an interior diameter of the bracelet 56.

The tracking unit 46 includes a tracking control circuit 58 that is integrated into the tracking housing 48. The tracking unit 46 includes a tracking transceiver 60 that is integrated into the tracking housing 48 and the tracking transceiver 60 is electrically coupled to the tracking control circuit 58. Furthermore, the tracking transceiver 60 broadcasts a tracking signal. The tracking transceiver 60 may comprise a radio frequency transceiver or the like and the tracking transceiver 60 may employ Bluetooth communication protocols. An activate button 62 is movably integrated into the tracking housing 48 and the activate button 62 can be manipulated by the driver 18. The activate button 62 is electrically coupled to the tracking control circuit 58 and the tracking control circuit 58 is actuated when the activate button 62 is depressed. The tracking includes a tracking power supply 64 that is integrated into the tracking housing 48 and the tracking power supply 64 is electrically coupled to the tracking control circuit 58.

A control unit 66 is positioned within the vehicle 16 and the control unit 66 is in remote communication with the tracking unit 46. The control unit 66 is in remote communication with the inside video camera 12 and each of the plurality of outside video cameras 26. The control unit 66 analyzes the tracking signal broadcast by the tracking unit 46. Furthermore, the control unit 66 actuates the inside video camera 12 and de-actuates each of the plurality of outside video cameras 26 when the control unit 66 determines the tracking unit 46 is inside of the vehicle 16. Conversely, the control unit 66 de-actuates the inside video camera 12 and actuates each of the plurality of outside video cameras 26 when the control unit 66 determines the tracking unit 46 is outside of the vehicle 16.

The control unit 66 comprises a master housing 68 that is positioned within the vehicle 16 and a master control circuit 70 that is integrated into the master housing 68. The master control circuit 70 is electrically coupled to the power source 22 comprising the electrical system of the vehicle 16. The control unit 66 includes a master transceiver 72 that is integrated into the master housing 68 and the master transceiver 72 is electrically coupled to the master control circuit 70. The master transceiver 72 is in wireless communication with the inside transceiver 24, the outside transceiver 44 associated with each of the outside video cameras 26 and the tracking transceiver 60. The master transceiver 72 may comprise a radio frequency transceiver or the like and the master transceiver 72 may employ Bluetooth communication protocols.

The control unit 66 includes a signal analyzer 74 that is positioned in the master housing 68 and the signal analyzer 74 is electrically coupled to the master control circuit 70. The signal analyzer 74 analyzes the tracking signal broadcast by the tracking transceiver 60. Furthermore, the master transceiver 72 broadcasts an actuate signal to the inside transceiver 24 when the signal analyzer 74 determines that the tracking signal has a signal strength that is above a pre-determined threshold. The inside control circuit 20 receives the actuate input when the inside transceiver 24 receives the actuate signal from the master transceiver 72. In this way the inside video camera 12 can record video footage when the driver 18 is inside of the vehicle 16.

The master transceiver 72 broadcasts an actuate signal to the outside transceiver 44 associated with each of the outside video cameras 26 when the signal analyzer 74 determines that the tracking signal has a signal strength that is below the pre-determined threshold. Additionally, the outside control circuit 42 associated with each of the outside video cameras 26 receives the actuate input when the outside transceiver 44 associated with each of the outside video cameras 26 receives the actuate input from the master transceiver 72. In this way each of the outside video cameras 26 can record video footage when the driver 18 exits the vehicle 16. The control unit 66 may be in electrical communication with door switches of the vehicle such that the control unit 66 detects when the driver's side door of the vehicle is opened. Furthermore, the control unit 66 may de-actuate the inside video camera and actuate the plurality of outside video cameras 26 when the control unit 66 detects that the driver's side door is opened.

In use, the tracking unit 46 is worn on the driver 18 at a preferred location and active button is depressed to turn on the tracking unit 46 thereby placing the tracking unit 46 in communication with the control unit 66. The inside video camera 12 is turned on when the driver 18 is inside of the cabin 14 of the vehicle 16. The inside video camera 12 is turned off and the plurality of outside video cameras 26 is turned on when the driver 18 10 exits the vehicle 16. In this way the driver 18 is continually recorded regardless of whether the driver 18 is seated in the vehicle 16 or if the driver 18 is outside of the vehicle 16.

With respect to the above description then, it is to be realized that the optimum 15 dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A vehicle surveillance assembly for recording footage within a vehicle and subsequently recording footage outside of the vehicle when a driver steps out of the vehicle, said assembly comprising:

an inside video camera being mounted within a cabin of a vehicle wherein said inside video camera is configured to record video footage of an interior of the cabin, said inside video camera being strategically positioned in the cabin to facilitate said inside video camera to record video footage of the driver while the driver is driving the vehicle;

a plurality of outside video cameras, each of said outside video cameras being mounted to an exterior of the vehicle wherein each of said outside video cameras is configured to record video footage of the environment surrounding the vehicle, said plurality of outside video cameras being positioned on a respective one of a front side of the vehicle and a back side of the vehicle and a first lateral side of the vehicle and a second lateral side of the vehicle wherein said plurality of outside video cameras is configured to record footage of 360.0 degrees around the vehicle;

a tracking unit being wearable on the driver of the vehicle, said tracking unit broadcasting a tracking signal; and a control unit being positioned within the vehicle, said control unit being in remote communication with said tracking unit, said control unit being in remote communication with said inside video camera and each of said plurality of outside video cameras, said control unit analyzing said tracking signal broadcast by said tracking unit, said control unit actuating said inside video camera and de-actuating each of said plurality of outside video cameras when said control unit determines said tracking unit is inside of the vehicle, said control unit de-actuating said inside video camera and actuating each of said plurality of outside video cameras when said control unit determines said tracking unit is outside of the vehicle.

2. The assembly according to claim 1, wherein said inside video camera includes:

an inside control circuit being integrated into said inside video camera, said inside control circuit receiving an actuate input, said inside video camera being turned on when said inside control circuit receives said actuate input, said inside control circuit being electrically coupled to a power source comprising an electrical system of the vehicle; and an inside transceiver being integrated into said inside video camera, said inside transceiver being electrically coupled to said inside control circuit.

3. The assembly according to claim 1, wherein each of said outside video cameras includes:

an outside control circuit being integrated into said outside video camera, said outside control circuit receiving an actuate input, said outside video camera being turned on when said outside control circuit receives said actuate input, said outside control circuit being electrically coupled to the power source comprising the electrical system of the vehicle; and an outside transceiver being integrated into said outside video camera, said outside transceiver being electrically coupled to said outside control circuit.

4. The assembly according to claim 1, wherein said tracking unit comprises:

a tracking housing having an engagement element being integrated into said tracking housing wherein said engagement element is configured to engage the driver for retaining said tracking housing on the driver;

a tracking control circuit being integrated into said tracking housing;

a tracking transceiver being integrated into said tracking housing, said tracking transceiver being electrically coupled to said tracking control circuit, said tracking transceiver broadcasting a tracking signal;

an activate button being movably integrated into said tracking housing wherein said activate button is configured to be manipulated by the driver, said activate button being electrically coupled to said tracking control circuit, said tracking control circuit being actuated when said activate button is depressed; and a tracking power supply being integrated into said tracking housing, said tracking power supply being electrically coupled to said tracking control circuit.

5. The assembly according to claim 4, wherein:

said inside video camera includes:

an inside control circuit being integrated into said inside video camera, said inside control circuit receiving an actuate input, said inside video camera being turned on when said inside control circuit receives said actuate input, said inside control circuit being electrically coupled to a power source comprising an electrical system of the vehicle; and an inside transceiver being integrated into said inside video camera, said inside transceiver being electrically coupled to said inside control circuit;

each of said outside video cameras includes:

an outside control circuit being integrated into said outside video camera, said outside control circuit receiving an actuate input, said outside video camera being turned on when said outside control circuit receives said actuate input, said outside control circuit being electrically coupled to the power source comprising the electrical system of the vehicle; and an outside transceiver being integrated into said outside video camera, said outside transceiver being electrically coupled to said outside control circuit; and said control unit comprises:

a master housing being positioned within the vehicle;

a master control circuit being integrated into said master housing, said master control circuit being electrically coupled to the power source comprising the electrical system of the vehicle;

a master transceiver being integrated into said master housing, said master transceiver being electrically coupled to said master control circuit, said master transceiver being in wireless communication with said inside transceiver and said outside transceiver associated with each of said outside video cameras and said tracking transceiver.

6. The assembly according to claim 5, wherein said control unit includes a signal analyzer being positioned in said master housing, said signal analyzer being electrically coupled to said master control circuit, said signal analyzer analyzing said tracking signal broadcast by said tracking transceiver.

7. The assembly according to claim 6, wherein said master transceiver broadcasts an actuate signal to said inside transceiver when said signal analyzer determines that said tracking signal has a signal strength that is above a pre-determined threshold, said inside control circuit receiving said actuate input when said inside transceiver receives said actuate signal from said master transceiver wherein said inside video camera is configured to record video footage when the driver is inside of the vehicle.

8. The assembly according to claim 6, wherein said master transceiver broadcasts an actuate signal to said outside transceiver associated with each of said outside video cameras when said signal analyzer determines that said tracking signal has a signal strength that is below said pre-determined threshold, said outside control circuit associated with each of said outside video cameras receiving said actuate input when said outside transceiver associated with each of said outside video cameras receives said actuate input from said master transceiver wherein each of said outside video cameras is configured to record video footage when the driver exits the vehicle.

9. A vehicle surveillance assembly for recording footage within a vehicle and subsequently recording footage outside of the vehicle when a driver steps out of the vehicle, said assembly comprising:

an inside video camera being mounted within a cabin of a vehicle wherein said inside video camera is configured to record video footage of an interior of the cabin, said inside video camera being strategically positioned in the cabin to facilitate said inside video camera to record video footage of the driver while the driver is driving the vehicle, said inside video camera including:

an inside control circuit being integrated into said inside video camera, said inside control circuit receiving an actuate input, said inside video camera being turned on when said inside control circuit receives said actuate input, said inside control circuit being electrically coupled to a power source comprising an electrical system of the vehicle; and an inside transceiver being integrated into said inside video camera, said inside transceiver being electrically coupled to said inside control circuit;

a plurality of outside video cameras, each of said outside video cameras being mounted to an exterior of the vehicle wherein each of said outside video cameras is configured to record video footage of the environment surrounding the vehicle, said plurality of outside video cameras being positioned on a respective one of a front side of the vehicle and a back side of the vehicle and a first lateral side of the vehicle and a second lateral side of the vehicle wherein said plurality of outside video cameras is configured to record footage of 360.0 degrees around the vehicle, each of said outside video cameras including:

an outside control circuit being integrated into said outside video camera, said outside control circuit receiving an actuate input, said outside video camera being turned on when said outside control circuit receives said actuate input, said outside control circuit being electrically coupled to the power source comprising the electrical system of the vehicle; and an outside transceiver being integrated into said outside video camera, said outside transceiver being electrically coupled to said outside control circuit;

a tracking unit being wearable on the driver of the vehicle, said tracking unit broadcasting a tracking signal, said tracking unit comprising:

a tracking housing having an engagement element being integrated into said tracking housing wherein said engagement element is configured to engage the driver for retaining said tracking housing on the driver;

a tracking control circuit being integrated into said tracking housing;

a tracking transceiver being integrated into said tracking housing, said tracking transceiver being electrically coupled to said tracking control circuit, said tracking transceiver broadcasting a tracking signal;

an activate button being movably integrated into said tracking housing wherein said activate button is configured to be manipulated by the driver, said activate button being electrically coupled to said tracking control circuit, said tracking control circuit being actuated when said activate button is depressed; and a tracking power supply being integrated into said tracking housing, said tracking power supply being electrically coupled to said tracking control circuit; and a control unit being positioned within the vehicle, said control unit being in remote communication with said tracking unit, said control unit being in remote communication with said inside video camera and each of said plurality of outside video cameras, said control unit analyzing said tracking signal broadcast by said tracking unit, said control unit actuating said inside video camera and de-actuating each of said plurality of outside video cameras when said control unit determines said tracking unit is inside of the vehicle, said control unit de-actuating said inside video camera and actuating each of said plurality of outside video cameras when said control unit determines said tracking unit is outside of the vehicle, said control unit comprising:
a master housing being positioned within the vehicle;
a master control circuit being integrated into said master housing, said master control circuit being electrically coupled to the power source comprising the electrical system of the vehicle;
a master transceiver being integrated into said master housing, said master transceiver being electrically coupled to said master control circuit, said master transceiver being in wireless communication with said inside transceiver and said outside transceiver associated with each of said outside video cameras and said tracking transceiver; and
a signal analyzer being positioned in said master housing, said signal analyzer being electrically coupled to said master control circuit, said signal analyzer analyzing said tracking signal broadcast by said tracking transceiver, said master transceiver broadcasting an actuate signal to said inside transceiver when said signal analyzer determines that said tracking signal has a signal strength that is above a pre-determined threshold, said inside control circuit receiving said actuate input when said inside transceiver receives said actuate signal from said master transceiver wherein said inside video camera is configured to record video footage when the driver is inside of the vehicle, said master transceiver broadcasting an actuate signal to said outside transceiver associated with each of said outside video cameras when said signal analyzer determines that said tracking signal has a signal strength that is below said pre- determined threshold, said outside control circuit associated with each of said outside video cameras receiving said actuate input when said outside transceiver associated with each of said outside video cameras receives said actuate input from said master transceiver wherein each of said outside video cameras is configured to record video footage when the driver exits the vehicle.

10. A vehicle surveillance system for recording footage within a vehicle and subsequently recording footage outside of said vehicle when a driver steps out of said vehicle, said system comprising:
a vehicle having a cabin;
an inside video camera being mounted within said cabin of said vehicle to record video footage of an interior of said cabin, said inside video camera being strategically positioned in said cabin to facilitate said inside video camera to record video footage of the driver while the driver is driving said vehicle, said inside video camera including:
an inside control circuit being integrated into said inside video camera, said inside control circuit receiving an actuate input, said inside video camera being turned on when said inside control circuit receives said actuate input, said inside control circuit being electrically coupled to a power source comprising an electrical system of said vehicle; and
an inside transceiver being integrated into said inside video camera, said inside transceiver being electrically coupled to said inside control circuit;
a plurality of outside video cameras, each of said outside video cameras being mounted to an exterior of said vehicle to record video footage of the environment surrounding said vehicle, said plurality of outside video cameras being positioned on a respective one of a front side of said vehicle and a back side of said vehicle and a first lateral side of said vehicle and a second lateral side of said vehicle to record footage of 360.0 degrees around said vehicle, each of said outside video cameras including:
an outside control circuit being integrated into said outside video camera, said outside control circuit receiving an actuate input, said outside video camera being turned on when said outside control circuit receives said actuate input, said outside control circuit being electrically coupled to the power source comprising the electrical system of said vehicle; and
an outside transceiver being integrated into said outside video camera, said outside transceiver being electrically coupled to said outside control circuit;
a tracking unit being wearable on the driver of said vehicle, said tracking unit broadcasting a tracking signal, said tracking unit comprising:
a tracking housing having an engagement element being integrated into said tracking housing wherein said engagement element is configured to engage the driver for retaining said tracking housing on the driver;
a tracking control circuit being integrated into said tracking housing;
a tracking transceiver being integrated into said tracking housing, said tracking transceiver being electrically coupled to said tracking control circuit, said tracking transceiver broadcasting a tracking signal;
an activate button being movably integrated into said tracking housing wherein said activate button is configured to be manipulated by the driver, said activate button being electrically coupled to said tracking control circuit, said tracking control circuit being actuated when said activate button is depressed; and
a tracking power supply being integrated into said tracking housing, said tracking power supply being electrically coupled to said tracking control circuit; and
a control unit being positioned within said vehicle, said control unit being in remote communication with said tracking unit, said control unit being in remote communication with said inside video camera and each of said plurality of outside video cameras, said control unit analyzing said tracking signal broadcast by said tracking unit, said control unit actuating said inside video camera and de-actuating each of said plurality of outside video cameras when said control unit determines said tracking unit is inside of said vehicle, said control unit de-actuating said inside video camera and actuating each of said plurality of outside video cameras when said control unit determines said tracking unit is outside of said vehicle, said control unit comprising:
a master housing being positioned within said vehicle;
a master control circuit being integrated into said master housing, said master control circuit being electrically coupled to the power source comprising the electrical system of said vehicle;
a master transceiver being integrated into said master housing, said master transceiver being electrically coupled to said master control circuit, said master transceiver being in wireless communication with said inside transceiver and said outside transceiver associated with each of said outside video cameras; and a signal analyzer being positioned in said master housing, said signal analyzer being electrically coupled to said master control circuit, said signal analyzer analyzing said tracking signal broadcast by said tracking transceiver, said master transceiver broadcasting an actuate signal to said inside transceiver when said signal analyzer determines that said tracking signal has a signal strength that is above a pre-determined threshold, said inside control circuit receiving said actuate input when said inside transceiver receives said actuate signal to record video footage when the driver is inside of said vehicle, said master transceiver broadcasting an actuate signal to said outside transceiver associated with each of said outside video cameras when said signal analyzer determines that said tracking signal has a signal strength that is below said pre-determined threshold, said outside control circuit associated with each of said outside video cameras receiving said actuate input when said outside transceiver associated with each of said outside video cameras receives said actuate input from said master transceiver to record video footage when the driver exits said vehicle.

* * * * *